Oct. 6, 1959

G. J. GIBSON ET AL 2,907,865

ELECTRIC ARC WELDING

Filed Nov. 1, 1954

INVENTORS
GLENN J GIBSON
HAROLD R LYONS
BY
ATTORNEY

Oct. 6, 1959

G. J. GIBSON ET AL 2,907,865

ELECTRIC ARC WELDING

Filed Nov. 1, 1954

INVENTORS
GLENN J GIBSON
HAROLD R LYONS
BY

ATTORNEY

United States Patent Office 2,907,865
Patented Oct. 6, 1959

2,907,865

ELECTRIC ARC WELDING

Glenn J. Gibson, Berkeley Heights, and Harold R. Lyons, Short Hills, N.J., assignors to Air Reduction Company, Incorporated, New York, N.Y., a corporation of New York Application November 1, 1954, Serial No. 466,106

2 Claims. (Cl. 219—74)

This invention relates to arc welding and more particularly to arc welding in an atmosphere of carbon dioxide.

In each of the several welding processes now in general use for consuming electrode metal arc welding it is necessary to provide fluxing and/or shielding to effect a refinement of the weld metal and/or to prevent formation of oxides and nitrides, and to prevent other reactions that reduce the physical properties of the weld metal. The common coated electrodes achieve the desired results by generating an arc atmosphere and providing a reactive slag cover for the weld puddle. Such electrodes are frequently costly to make and can be produced only in stick lengths. This means frequent interruptions in welding to change electrodes, and since the welding current passes through the whole length of the electrode there are definite limits on the maximum current that can be used. Stub end losses, which are inherent, are uneconomic. Submerged arc welding overcomes some of these difficulties in that it employs a continuous bare wire electrode in which the arc is buried in a melt of prefused flux. In this process, welding is limited for the most part to downhand welding unless special apparatus is provided to hold the flux in place for position welding. The flux is expensive and something of a nuisance to handle, and the weld must be made "blind," inasmuch as the operator is unable to see the arc or the joint being welded. More recently the inert gas shielded metal arc welding process disclosed in Muller et al. Patent No. 2,504,868 has come into use. This has the advantage of using a continuous bare electrode at high current density, the advantage of being completely visible, and the advantage of being free of slag and fluxes. The inert gas used to shield the arc and the weld puddle dissipates in the air, and there is no cleaning or auxiliary operations needed between passes or after the completion of the weld. This process produces sound weld metal at high speeds and has proved entirely satisfactory from a speed and quality point of view. The shielding gas used in the Muller et al. process preferably comprises monatomic inert gas such as argon or helium which is relatively expensive. Consuming electrode welding in air without benefit of a flux or gas shield is entirely impractical except for the lowest quality joining operations.

An object of the present invention is to provide a welding method employing a continuously fed bare wire electrode, which has a visible arc, has the operating convenience of inert gas shielded metal arc welding, and employs a gaseous atmosphere that is substantially less costly than inert monatomic gas.

Another object is to provide a gas shielded metal arc welding process employing a shielding gas of a composition other than inert monatomic gas that produces sound weld metal having good physical properties and is free from an objectionable amount of weld spatter.

Another object is to provide a gas shielded metal arc welding process employing a low cost shielding gas that is non-inflammable and non-toxic.

These and other objects of the invention will be pointed out or will become apparent from the following detailed description of one embodiment of the invention.

According to the present invention, it has been found that under certain controlled conditions a welding arc may be maintained between a consuming wire electrode and a workpiece in an atmosphere of carbon dioxide to produce high speed high quality welds in ferrous materials. The main function of the carbon dioxide is to exclude the ambient atmosphere from the region of the arc. This can be done by a flowing stream of carbon dioxide so directed as to envelop the arc end of the electrode, the arc, and the molten weld metal produced thereby. Inasmuch as carbon dioxide is relatively dense, it can conveniently be employed to envelop the arc in a substantially non-turbulent flow stream having adequate stiffness without the necessity of using excessive amounts.

To exclude the air alone however, is not sufficient to achieve the objects of the present invention. It has been found that a certain relationship must exist between electrode diameter, current, arc length, and the composition of the electrode wire if sound weld metal is to be produced without excessive weld spatter. Other factors such as the type of welding current, the weld travel speed and the composition of the workpiece being welded also are significant factors in accomplishing the objects of the present invention. The relationship of these variables is disclosed in detail in the following description which may be more fully understood by reference to the accompanying drawings.

Figure 1:
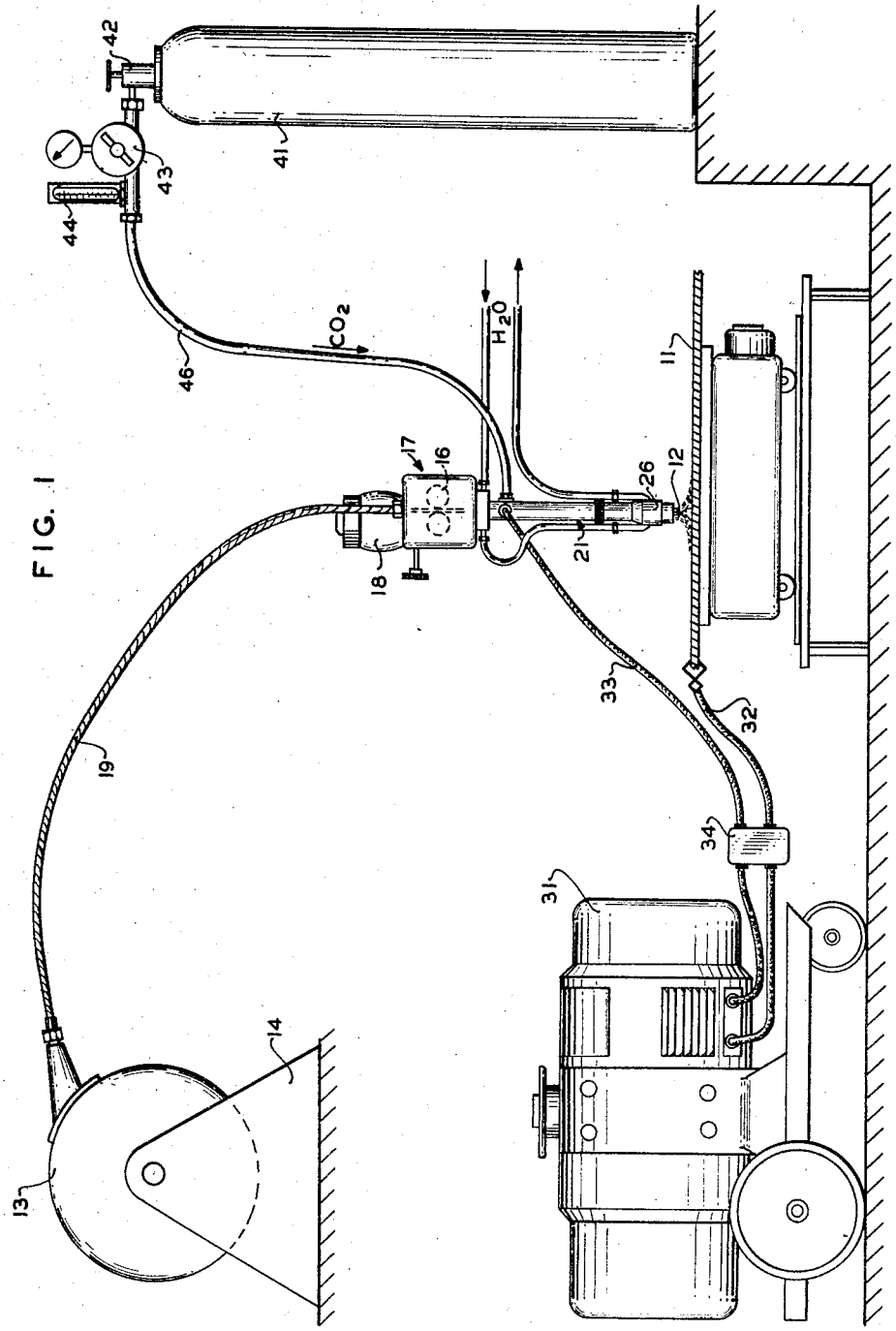
Fig. 1 illustrates in simplified form suitable apparatus for the conduct of the present invention.
Figure 2:
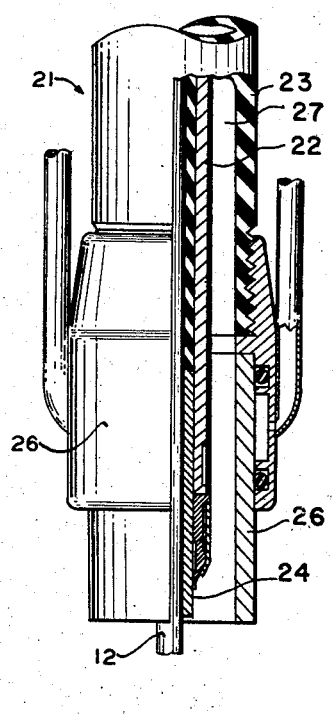
Fig. 2 illustrates partially in section and on a larger scale, a portion of the welding head of Fig. 1.

Referring to Fig. 1 of the drawing the work or plate to be welded is designated 11. The welding electrode 12 is supplied in the form of a long length of wire dispensed from a reel 13 rotatably mounted on a fixed support 14. Feed rolls 16 in a welding head 17 are driven by electric motor means 18. The power driven feed rolls 16 withdraw the wire 12 from the reel 13 through a flexible casing 19 and push the wire through the welding head barrel 21. The welding head barrel 21 comprises an inner barrel assembly 22 (Fig. 2) and an outer barrel 23. The inner barrel terminates in a contact tube 24 which acts to introduce welding current to the electrode wire as the wire passes therethrough. The outer barrel 23 teminates in the nozzle 26 surrounding the inner barrel assembly and the contact tube. The annular space 27 between the inner and outer barrel and between the contact tube and the nozzle forms a gas passage for the flow of shielding gas to the arc region. The welding head barrel is preferably designed in such a manner that the gas emerges from the gas nozzle as a substantially non-turbulent flow stream to shield the end of the electrode, the arc, and the weld puddle from the ambient air. Mikhalapov Patent No. 2,544,711 issued March 13, 1951 and Muller-Gibson Patent No. 2,544,801 also issued March 13, 1951 disclose in detail preferred ways of forming the required substantially nonturbulent gas shield.

The welding current may be provided by a conventional welding machine 31. One terminal of the welding machine is electrically connected to the work by a conductor 32 and the other terminal is electrically connected by the conductor 33 to the welding head 21, through which current is transferred by the contact tube 24 to the electrode wire 12. A contactor 34 is preferably included for opening and closing the welding circuit.

Carbon dioxide is supplied from a superatmospheric pressure source such as cylinder 41 equipped with a cylinder valve 42, a pressure reducing valve 43, and a flowmeter 44. Conduit 46 carries the carbon dioxide to the inlet fitting in the welding head. This fitting communicates with the annular space 27 between the inner and outer barrels and provides for the delivery of carbon dioxide to the nozzle.

Briefly, the operation of this apparatus is as follows. Shielding gas flow is initiated by opening cylinder valve 42 and adjusting the pressure regulator 43 until the desired gas flow is indicated on flowmeter 44. The contactor 34 is closed energizing the electrode and the workpiece. The electrode 12 is then advanced to touch the work 11 and establish the arc. The wire is then fed toward the work continuously at a rate to maintain the arc. Since close control of arc length in this process is essential, it is preferred to feed the wire from an automatic arc welding head as illustrated in the drawing. Such automatic heads respond to changes in arc voltage to automatically maintain the arc voltage, and hence the arc length, substantially constant. However, this invention is not limited to the use of automatic arc welding heads but may be used with constant wire feed speed apparatus such as manual apparatus of the type now commonly employed for inert gas shielded metal arc welding.

Prior attempts to weld in a carbon dioxide atmosphere have not met with commercial success because certain critical relationships between wire feed speed, current density, and electrode wire composition were not maintained. It has now been found that for successful operating conditions with a steel welding wire in a carbon dioxide atmosphere, it is absolutely essential that the apparent arc length i.e., that part of the actual arc length which is above the surface of the workpiece (or the distance from the tip of the electrode wire to the plane of the surface of the workpiece), be less than $\frac{1}{8}''$. Under the welding conditions disclosed herein the arc operates in the deep depression formed in the surface of the work by the arc forces and the arc is substantially wholly beneath the surface of the work, with only a very short apparent arc length above the surface of the work. For best operation under almost all conditions, this apparent arc length should be less than $\frac{1}{16}''$ which is the maximum arc length for the preferred embodiment of the present invention. The value of the welding current has also been found to be an important factor in the combination essential to high quality carbon dioxide shielded welds. The current must be maintained at a value high enough to prevent short-circuiting of the arc by the molten metal transferring across the arc. At the other end of the range, the current is limited to that high value which superheats the molten metal and the weld puddle to an extent which promotes excessive "rimming" action in the weld pool. The term "rimming" as used herein refers to the well known metallurgical reaction occurring in molten iron in which dissolved iron oxide is reduced by dissolved carbon to produce carbon monoxide, which evolves as a gas. The carbon monoxide so produced usually becomes trapped in the weld metal when the weld metal freezes and a porous weld results. This cause of porosity can be largely eliminated by limiting the welding current to a value below that which will superheat the welding metal to an extent to create a violent "rimming" reaction.

In addition, arc length and current are in part dependent on one another. The range of operating arc lengths is predicted by the desired welding current. Low current arcs cannot always be shortened without excessive instability and short circuits, and therefore, may have to be operated at arc lengths greater than $\frac{1}{16}''$. Increased welding current causes both an increase in the deposition rate and in the arc forces while usually reducing drop size. Such increased current may produce a superheated agitated weld pool in which a rimming reaction actively proceeds, and from which a shower of spatter is projected. Weld metal so produced is porous. Using an arc of minimum length improves these conditions. It therefore is apparent that for any given set of welding conditions, there is an optimum value of current and arc length bounded on one side of spatter, porosity, and insufficient deposition, and on the other side by arc instability and poor bead shape.

Figure 3:
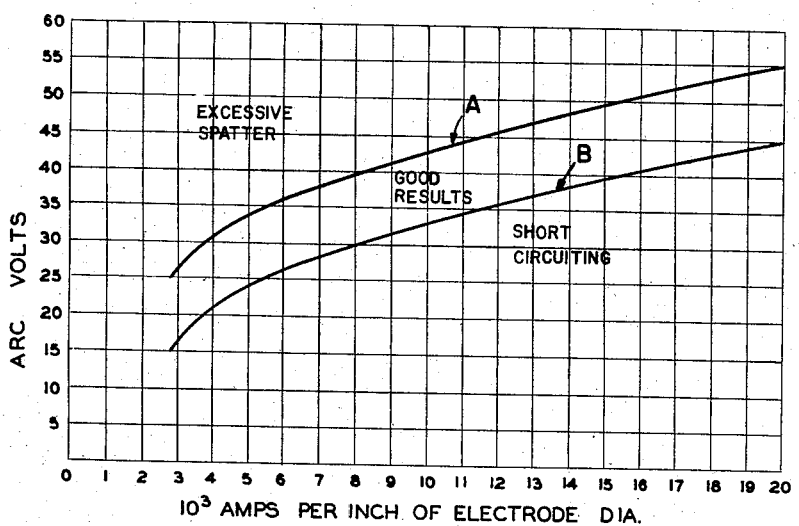
Fig. 3 is a graph illustrating the necessary relationship between certain variables of the process to produce quality welds.

To define the critical relationship between electrode diameter, welding current, and arc length, a large number of experiments were conducted and the results therefrom analyzed to find a criterion by which the results of weldfing in $CO_2$ could be predicted. It was found that all successful $CO_2$ shielded welds followed a definite pattern, relating arc voltage to the value of the welding current per inch of electrode diameter. Arc voltage as used in this relationship is the voltage between the contact tube in the welding head and the workpiece, and includes in its value the voltage drop due to the resistance of the terminal portion of the electrode (from the contact tube to the arc end) and the contact resistance between the electrode and contact tube in addition to the actual voltage drop across the arc. Arc length, which is critical but difficult to define or measure, is reflected in this arc voltage factor. The welding current strength expressed as amperes per inch of electrode diameter (use equivalent diameter, if the electrode is noncircular) includes in its value the critically related current and wire diameter factors. It has been found that if arc volts are plotted against amperes of welding current per inch of electrode diameter a regular relationship appears for all combinations of current, arc length, and electrode diameters that produces satisfactory welding conditions, i.e. substantially free from stubbing and short circuiting, and a minimum of spatter. This relationship is illustrated in Figure 3. The equation of curve A plotted thereon which separates the conditions with which excessive spatter occurs from satisfactory welding conditions is $$(y-20)^2 = 0.07(x-2400)$$

where $y$ is equal to arc volts and $x$ is amperes of welding current per inch of electrode diameter. A similar curve, curve B, defines the conditions below which stubbing and short circuiting become excessive. This curve can be expressed by the equation $$(y-10)^2 = 0.07(x-2400)$$

It is essential when welding in a $CO_2$ atmosphere to maintain operating conditions that fall within the zone defined by these curves if quality welds are to be produced. The critical relationship between arc length, current, and wire diameter is expressed by these curves in terms of definite and easily determined variables.

In general, reverse polarity direct current offers more advantages for use in carbon dioxide shielded arcs than straight polarity. Reverse polarity is preferred over the entire range of operable welding currents. At currents below 350 amperes, straight polarity produces a reasonably acceptable bead at a deposition rate almost double that possible using reverse polarity. At currents above 350 amperes, straight polarity produces excessive spatter and porosity.

All of the aforementioned variables are dependent to some degree upon travel speed. Low travel speeds allow more energy to be absorbed by the weld, permitting rimming to be more active which results in increased spatter and porosity. Excessive travel speeds frequently force a shower of spatter from the weld crater, increasing undercutting, and causing discontinuities in the weld bead.

High speed motion pictures show that spatter results in the carbon dioxide shielded arc welding process from all known mechanisms of spatter formation except magnetic arc blow. Rimming action, short circuit fuse action, and mechanical agitation from the arc forces all produce spatter. With short arcs, spatter has a greater probability for remaining in the weld pool, and the tendency for large drop formations is reduced.

Possibly the most important single element outside of the arc length, current, wire diameter relationships contributing to the successful accomplishment of carbon dioxide shielded metal arc welding is the composition of the electrode wire. The electrode composition has an effect upon the arc characteristic, the weld deposit shape, the weld deposit surface condition, and the soundness of the weld metal. While this invention contemplates primarily the use of bare solid electrode wires, it is to be understood that the use of cored wires, having bare conductive surfaces and solid wires having light electrically conductive coating, are also contemplated.

Extensive tests show that sound weld deposits in steel can be made in a carbon dioxide atmosphere only if a deoxidized electrode wire is used, and preferably one containing residual deoxidizing power. Killed steel wires containing a minimum of .25% silicon provide such residual deoxidizing power. The analyses of wires containing sufficient deoxidizing power to produce sound welds are shown in Table I below.

Table I

|   | C | Mn | Si | S | P | Al | Cr | V | Fe |
|---|---|---|---|---|---|---|---|---|---|
| Wire 1__percent__ | .10 | 1.00 | .45 | .02 | .02 | | | | Bal. |
| Wire 2____do____ | .10 | 1.30 | .25 | .03 | .03 | .02 | | | Bal. |
| Wire 3____do____ | .30 | .80 | .30 | .01 | .01 | | .95 | .20 | Bal. |

An example of the practice of the present invention is as follows. To weld overlapped rimmed steel workpieces 0.088" thick, a weld bead was deposited with a carbon dioxide shielded arc in the fillet formed between the edge of the overlapping piece and the top surface of the underlying piece. High quality welds were made on a commercial basis using direct current reverse polarity with a 1/16 inch diameter electrode wire of the analysis given for wire 1 in Table I above. The electrode wire was fed at 310 inches per minute, and a welding current of 430 amperes was used at an arc voltage of 30.5 volts. The arc was shielded with a flow of 75 cubic feet per hour of commercially pure $CO_2$ projected from a 1 inch diameter nozzle. The welding (travel) speed was 188 inches per minute.

An example of the use of the $CO_2$ shielded metal arc welding process for multi-pass welds is as follows. Welds were made in 1/2" hot rolled plate in six passes in a joint having a 60° included angle and a 1/8" root opening with a back-up. Using a 1/16" diameter electrode wire of the analysis of wire 2 in Table I above, and 315 amperes direct current reverse polarity, each pass was made at 18 inches per minute with an arc length such that the arc voltage was 31 volts. The arc was shielded with commercially pure $CO_2$ supplied from a 1" diameter nozzle at a flow rate of 60 cubic feet per hour.

It will be evident that as a result of this invention it has been made possible to produce high quality welds at high speeds with a consuming electrode arc welding process employing a carbon dioxide arc shielding atmosphere. It is to be understood that the invention is not limited to the particular form shown, but may be used in other ways without departing from its spirit, as defined by the following claims.

We claim:

1. In a method of electric arc welding in which a welding arc is established and maintained between a consumable wire electrode and a workpiece in a shielding atmosphere formed by delivering a flowing stream of carbon dioxide to the region of the arc, the improvement which comprises feeding a ferrous wire electrode containing at least .25% by weight silicon to said arc continuously as said electrode is consumed by the arc, and supplying welding current to said arc at a current density so correlated in relation to the feed speed of said electrode as to cause said welding arc to be buried, without short circuiting, substantially wholly below the surface of the workpiece with not more than 1/16th inch of said arc length above the surface of the workpiece.

2. In the method of electric arc welding in which a welding arc is established and maintained between a consumable ferrous wire electrode and a workpiece in a shielding atmosphere formed by delivering a flowing stream of carbon dioxide to the region of the arc, the improvement which comprises correlating the welding current, voltage, and wire feed speed to maintain the position of the arc end of the electrode wire with respect to the surface of the work such that the arc is substantially wholly beneath the surface of the work.

References Cited in the file of this patent

UNITED STATES PATENTS

| 903,826 | Arsem | Nov. 17, 1908 |
| 1,589,017 | Lincoln | June 5, 1926 |
| 2,497,629 | Rieppel | Feb. 14, 1950 |
| 2,504,867 | Muller | Apr. 18, 1950 |
| 2,504,868 | Muller et al. | Apr. 18, 1950 |
| 2,544,711 | Mikhalapov | Mar. 13, 1951 |
| 2,621,278 | Muller | Dec. 9, 1952 |
| 2,824,948 | Willigen et al. | Feb. 25, 1958 |
| 2,863,981 | Thomas et al. | Dec. 9, 1958 |

FOREIGN PATENTS

| 482,792 | Canada | Apr. 29, 1952 |
| 527,009 | Belgium | Sept. 6, 1954 |
| 1,102,303 | France | May 4, 1955 |

OTHER REFERENCES

Abridgment of "Stability of Welding Arc," by P. Alexander, Journal A.I.E.E., February 1928, pp. 109–112.